United States Patent Office 3,030,173
Patented Apr. 17, 1962

3,030,173
PROCESS FOR THE UNIFORM PREPARATION OF SHAPED STRUCTURES SUCH AS FILAMENTS OR FOILS FROM HIGH-MELTING LINEAR POLYESTERS
Herbert Kurzke and Helmut Sattler, Bobingen, near Augsburg, Germany, assignors to Farbwerke Hoechst Aktiengesellschaft vormals Meister Lucius & Brüning, Frankfurt am Main, Germany, a corporation of Germany
No Drawing. Filed Sept. 30, 1959, Ser. No. 843,337
6 Claims. (Cl. 18—54)

The present invention is a continuation-in-part application of our application Serial No. 578,573, filed April 17, 1956, and now abandoned.

In the preparation of shaped structures from high-melting linear polyesters, especially terephthalic acid polyesters, the polymerization products are shaped from the fused mass or from solutions. In this manner, filaments are obtained by forcing the material through a nozzle provided with holes, while foils are produced by forcing the material through a nozzle provided with a slit. These preshaped structures are drawn off from the nozzles and collected on bobbins, rollers or the like. Subsequently, the products are stretched in appropriate arrangements at room temperature or at a raised temperature to a multiple of their original measures, thus imparting to the products a lasting molecular orientation and consequently a high strength.

When the filaments or films are drawn off the shaping mechanism, there is already imparted to them a weak molecular pre-orientation, the degree of which depends in a complicated manner upon the technical conditions used such as material, degree of polymerization, spinning temperature, arrangement and size of the nozzles and the rate at which the products are drawn off.

Among these parameters there are some, for example, the conditions under which the shaped structures obtained from the melt are cooled, in which the constancy can only be obtained with great difficulty. For this reason and since it is also difficult to adapt to one another several mechanisms for shaping and drawing off which work simultaneously, excessive technical expenditures and constant complicated control are necessary in order to impart a uniform pre-orientation to the filaments and two dimensional structures.

The degree of the molecular pre-orientation is of great importance for the further stages of processing and also for the properties of the final product. For example, in the final orienting stretching, the stretchability depends on the pre-orientation. In the case of filaments, the textile values of the final product such as tensile strength, elongation at break, moduli of elasticity and also affinity for dyestuffs and finishing agents are also influenced by the pre-orientation.

In the known processes, special measures had to be taken in order to obtain a uniform pre-orientation. It is an object of the present invention to eliminate the influence of the pre-orientation on the further processing and on the properties of the final products in order to obtain an enhanced uniformity of the final products and to make special measures and controls for maintaining the constancy of the pre-orientation as far as possible superfluous.

A simple measure for the molecular pre-orientation is the optical double refraction as it can be observed when the structures are regarded in polarized light and which can be easily measured by appropriate means. The greater the pre-orientation, the greater is the double refraction.

Now, we have found that the double refraction and thus also the molecular pre-orientation disappear when a non-stretched but pre-oriented structure of high-melting linear polyesters is heated to a temperature between the second order transition point of the substance concerned and the lower limit of the thermoplastic temperature range, i.e. to between about 70° C. and about 180° C. (Concerning the term "second order transition point" see "Textile Research," vol. XV/11, page 891, and "Journal of Applied Physics," vol. XX, June 1949, page 564 and U.S. Patent No. 2,578,899.) In the case of the linear polyesters according to the invention, the second order transition temperature is in general between 65° C. and 70° C.

The disappearance of the pre-orientation or double refraction can also be noted by the slight decrease of the specific gravity which takes place on heating. A raised specific gravity always means a tighter packing of the filament molecules, i.e. a higher degree of pre-orientation.

The pre-orientation disappears when the unstretched shaped structure is heated in water or steam or when it is exposed to hot air. It is already sufficient to expose the material for a few minutes to the action of temperature.

The above mentioned disappearance of the double refraction and consequently of the pre-orientation is surprising, especially since chips of terephthalic acid polyesters which have been dried for a prolonged time at temperatures of above 120° C. display a gradual increase of random crystallization. This increase is simultaneously characterized by an increase in the specific gravity of the chips. The increase of random crystallization on drying is due to the fact that the temperature acts upon the material for a prolonged time, that is to say for more than ½ hour.

In the process according to the invention, the increase in random crystallization and in specific gravity can be avoided either by limiting the length of time during which the material is exposed to the temperature to a few seconds or, and this being a reliable method, by choosing a temperature below the apparent minimum crystallization temperature of the substance concerned. In U.S. Patent No. 2,578,899 mentioned above, said temperature is, for example, defined as the lowest temperature at which an essential crystallization of the polyester takes place within six hours. In the case of most of the high-melting polyesters coming into consideration for the preparation of fibers, this temperature is at about 100° C. In the process of the invention, the preferred temperature for the heat treatment is therefore between the second order transition point and the apparent minimum crystallization temperature of the linear polyester concerned, i.e. between 70° C. and 100° C.

It is a further object of the invention that shaped structures from terephthalic acid polyesters such as filaments or foils, the molecular pre-orientation of which has been eliminated as described above by heating to a temperature above the second order transition temperature, can be oriented by stretching in known manner, while cold or hot. By said stretching in at least one dimension, strengths which correspond to the normal values as they are obtained by stretching pre-oriented structures, are imparted to the filaments and foils. When the molecular pre-orientation produced in shaped structures from terephthalic acid polyesters on drawing said structures off the shaping mechanism is eliminated by heating to a temperature above the second order transition point, the final molecular orientation and thus a plurality of physical properties of said structures depend only on the subsequent stretching process which can be controlled much more easily than the complicated shaping process which is exposed to numerous uncontrollable influences, as is the case for example with the spinning process for filaments. The lower the degree of molecular pre-orientation, the higher is the extent to which shaped structures from linear polyesters can be stretched.

Since the pre-orientation is eliminated by the heat treatment of the not stretched material according to the invention, higher degrees of stretch can be obtained.

The possibility of eliminating the molecular pre-orientation permits the carrying through of the following process for preparing shaped structures of an increased strength from linear polyesters.

The structures—filaments or foils—are shaped in the usual manner with the aid of an appropriate mechanism, in most cases by means of a nozzle, drawn off said mechanism and, if desired, wound on to storage bobbins or rollers. It cannot be avoided that a molecular pre-orientation is imparted to the structures on taking-off. Subsequently the pre-oriented shaped structures are subjected to a heat treatment at a temperature above the second order transition point and below the lower limit of the thermoplastic temperature range of the polyester concerned, i.e. in general at a temperature between 70° C. and 180° C. The heat treatment is preferably carried out at a temperature between the second order transition point and the apparent minimum crystallization point of the polyester, i.e. at a temperature between 70° C. and 100° C.

When carrying out the heat treatment it is immaterial in which manner the heat is supplied. The structures may be heated by dipping them into hot or boiling water or into any other liquid which does not dissolve the polyester, or by applying a heat transferring gaseous medium such as vapor under atmospheric or superatmospheric pressure or heated air or any other heated gas. The structures can also be heated by radiation or contact heating. For carrying out the process in industry it is particularly suitable to use a heat transferring medium of high heat content, for example hot water or steam.

For eliminating the molecular pre-orientation in accordance with the process of the invention, it is furthermore immaterial in which manner the structure is subjected to the heat treatment. Structures having the form of threads can be treated discontinuously thus preventing them from shrinking, or in the form of hanks so that a shrinkage can take place. They can also be treated continuously in the form of continuous filament yarns or tows, while allowing a shrinkage to take place or not. The same applies to foils.

Concerning the minimum length of time required for the heat treatment, it has been found that at temperatures near 100° C., for example at 95° C. and above, it is sufficient to impart to the structures the temperature of treatment only for a period of fractions of one second to at most a few seconds. When the treatment is carried out at lower temperatures, a longer period of time is necessary for eliminating the pre-orientation, i.e. about 20 seconds at 70° C.

The maximum length of time of the heat treatment must be chosen in a manner such as does not affect the later stretchability of the structures. At temperatures of approximately 100° C., it must not exceed a few minutes. Temperatures above 100° C. are associated with a still considerably shorter maximum period of time. When, in industry, the heat treatment is carried out with thick structures such as thick foils or structures consisting of thick layers of threads, for example tows or thick tops, the time necessary for the heat to penetrate into the interior of the thick structure must not exceed the maximum length of time of the heat treatment at the exterior of the structure exposed to the heat. The thickness of the packing is thus limited and must be reduced if necessary.

The process of the invention offers a number of methods of heat treatment which can be carried out with advantage in industry. For example, the shaped structures, for instance filaments, can be wound on to bobbins after they have been drawn off the spinning nozzles, and exposed immediately or after re-winding to another bobbin or in the form of a slack rope to a heat treatment in a water bath, steam chamber or a chamber which is filled with hot air or through which hot air flows. Subsequently, the filaments are continuously stretched while hot or cold in the manner usually applied in the case of linear polyesters.

It is, however, especially advantageous to effect the heat treatment continuously by conducting the structure directly from the shaping mechanism, storage bobbin or storage roller through a heating zone, for example a water bath at 70° C. to 100° C. or a chamber which is filled with steam or through which steam flows. It is not necessary that the heat treatment is carried out immediately after or a short time after the spinning process. It may also be carried out with the same result with shaped structures which are several weeks old.

After the continuous heat treatment described above, the structures can be again collected on storage bobbins or introduced immediately in a continuous manner into a stretching mechanism where they are oriented by stretching as usual in the case of linear polyesters. In general the stretchability, that is to say the ratio at which the material can be stretched, is increased due to the disappearance of the pre-orientation.

Except for the starting material, the physical properties of the shaped structures obtained from linear high-melting polyesters according to the invention no longer depend on the spinning process but only on the orienting stretching process. All special measures for maintaining the uniformity of the pre-orientation and for the continuous control of said pre-orientation as they have hitherto been necessary when proceeding in the known processes without removal of the pre-orientation, can therefore be dispensed with.

The following examples serve to illustrate the invention but they are not intended to limit it thereto.

*Example 1*

By melting chips and forcing the melt so obtained through a nozzle, there is spun a thread of polyethylene terephthalate having a titer of 200 deniers and consisting of 18 individual filaments. The thread is drawn off at a rate of 800 meters per minute and wound on to a bobbin. The thread displays a marked pre-orientation characterized by a double refraction of $4 \times 10^{-3}$. Subsequently the thread is run continuously and without tension for a time of dwell of two seconds through a water bath of 95° C. After this treatment, the double refraction and, consequently, the pre-orientatoin of the thread have completely disappeared. The thread is then oriented by stretching, while cold, to a final titer of 42 deniers. The tensile breaking strength of the finished thread amounts to 5.2 grams/denier and the elongation at break to 17 percent.

*Example 2*

A thread of polyethylene terephthalate having a titer of 300 deniers and consisting of 6 individual filaments is drawn off a spinning nozzle and wound on to a perforated metal bobbin. The bobbin with the thread is introduced for 20 seconds into a water bath of 95° C. Since the thread is wound upon the bobbin it cannot shrink. After the heat treatment, the double refraction of the thread has diminished to the limit of measurability. The thread is then oriented by stretching as usual.

*Example 3*

By melting the chips and forcing the melt so obtained through a nozzle there is obtained a thread of polyethylene terephthalate having a titer of 200 deniers and consisting of 18 individual filaments. The thread is subsequently wound upon a bobbin. It shows a marked pre-orientation characterized by a double refraction of $5.4 \times 10^{-3}$. The thread is then continuously passed at a rate of 6.2 meters per minute through a chamber filled with steam. The rate at which the thread enters the chamber is equal to the rate at which it leaves the chamber. In the chamber, the steam has a temperature of 98° C. During the steam treatment the thread is under a tension of 1.2 mg./denier. By said steam treatment, the molecular pre-orientation of the material disappears almost completely. The double refraction diminishes to $0.8 \times 10^{-3}$. Subsequently, the thread is oriented and stretched, also continuously, the five times its original length by passing it around a metal cylinder of a diameter of 6 cm. which has been heated to 95° C. and by means of appropriate rolls. The total titer of the thread so obtained amounts to 40 deniers and the titer of the individual filaments amounts to 2.2 deniers. The thread possesses a tensile breaking strength of 5.4 g./denier and an elongation at break of 32 percent. When the thread is stretched by means of the same stretching mechanism but without having been passed through a steam bath prior to the orienting stretching process, it can be stretched only to four times its original length.

The process of the invention is of special importance for the processing of polymethylene terephthalates, particularly polyethylene terephthalate. The process is, however, also applicable in the same manner to filaments and two dimensional structures from other high-melting polyesters such as the polyester of para-ω-hydroxybutoxybenzoic acid and the polyester of hydroxypivalic acid. For carrying out the process of the invention there are further suited fiber-forming polyesters in which a minor quantity of other modifying bifunctional components is incorporated, for example isophthalic acid, adipic acid, sebacic acid, diphenyl-para-para-dicarboxylic acid, naphthalene-2.7-dicarboxylic acid, naphthalene-1.5-dicarboxylic acid, or in the preparation of which other glycols such as 1.4-butanediol, or hexamethylene glycol have been used.

Obviously many modifications and variations of the present invention are possible in the light of the above teachings. It is, therefore, to be understood that within the scope of the appended claims the invention may be practiced otherwise than as specifically described.

We claim:

1. In the process for producing shaped structures of polyethylene terephthalate, in which process the structures are drawn off a shaping device, then subjected to a controlled stretching, the step which comprises removing pre-orientation of the structures formed during the drawing off step by heating the shaped structures after they have been drawn off and before the controlled stretching to a temperature within the range of about 70° C. to about 100° C.

2. The process according to claim 1 wherein the shaped structures are wound on to a bobbin as they are drawn off and before being subjected to said controlled stretching.

3. The process according to claim 1, wherein the shaped structures are heated by means of hot water.

4. The process according to claim 1, wherein the shaped structures are heated by means of heated air.

5. The process according to claim 1, wherein the shaped structures are heated by means of steam.

6. In the process for producing shaped structures of polyethylene terephthalate in which process the structures are drawn off of a shaping device and then subjected to a non-orienting stretching and to a molecular orienting drawing, the step which comprises removing the pre-orientation of the structures inherently formed during the drawing off step by heating the shaped structures after they have been drawn off from the shaping device and prior to said stretching and drawing step to a temperature within the range of about 70–100° C.

References Cited in the file of this patent

UNITED STATES PATENTS

| | | |
|---|---|---|
| 2,578,899 | Pace | Dec. 18, 1951 |
| 2,596,128 | Chavannes et al. | May 13, 1952 |
| 2,917,779 | Kurzke et al. | Dec. 22, 1959 |
| 2,928,132 | Richards | Mar. 15, 1960 |
| 2,931,068 | Kitson et al. | Apr. 5, 1960 |
| 2,952,879 | Kitson et al. | Sept. 20, 1960 |